(12) United States Patent
Panahpour Tehrani et al.

(10) Patent No.: US 8,428,350 B2
(45) Date of Patent: Apr. 23, 2013

(54) COLOR CORRECTION APPARATUS, METHOD AND COMPUTER PROGRAM

(75) Inventors: Mehrdad Panahpour Tehrani, Saitama (JP); Akio Ishikawa, Saitama (JP); Shigeyuki Sakazawa, Saitama (JP)

(73) Assignee: KDDI Corporation, Tokyo (JP)

( * ) Notice: Subject to any disclaimer, the term of this patent is extended or adjusted under 35 U.S.C. 154(b) by 449 days.

(21) Appl. No.: 12/178,335

(22) Filed: Jul. 23, 2008

(65) Prior Publication Data

US 2009/0052776 A1 Feb. 26, 2009

(30) Foreign Application Priority Data

Aug. 21, 2007 (JP) ................................. 2007-214702

(51) Int. Cl.
*G06K 9/00* (2006.01)
(52) U.S. Cl.
USPC ......................................... 382/167; 348/239
(58) Field of Classification Search .................. 348/239, 348/207, 47, 402.1; 382/286, 154, 132, 261, 382/299, 103, 254; 370/345; 345/629; 352/57; 375/240.03, 240.12; 386/278
See application file for complete search history.

(56) References Cited

U.S. PATENT DOCUMENTS

| | | | | |
|---|---|---|---|---|
| 5,862,268 A * | 1/1999 | Boehlke | ........................ | 382/299 |
| 7,512,251 B2 * | 3/2009 | Nobori et al. | .................. | 382/103 |
| 7,903,898 B2 * | 3/2011 | Ito et al. | ......................... | 382/254 |
| 7,912,337 B2 * | 3/2011 | Souchard | ....................... | 386/278 |
| 2002/0067465 A1 * | 6/2002 | Li | .................................... | 352/57 |
| 2005/0088515 A1 * | 4/2005 | Geng | .................................. | 348/47 |
| 2005/0104902 A1 * | 5/2005 | Zhang et al. | .................... | 345/629 |
| 2005/0190835 A1 * | 9/2005 | Martins et al. | ........... | 375/240.03 |
| 2006/0056731 A1 * | 3/2006 | Bouk et al. | ..................... | 382/286 |
| 2006/0061658 A1 * | 3/2006 | Faulkner et al. | ........... | 348/207.1 |
| 2006/0115184 A1 * | 6/2006 | Michel | ........................... | 382/299 |
| 2006/0268131 A1 * | 11/2006 | Cutler | ............................ | 348/239 |
| 2007/0147502 A1 * | 6/2007 | Nakamura | ............... | 375/240.12 |
| 2008/0181487 A1 * | 7/2008 | Hsu et al. | ....................... | 382/154 |
| 2008/0204592 A1 * | 8/2008 | Jia et al. | ...................... | 348/402.1 |
| 2009/0060312 A1 * | 3/2009 | Kitamura | ........................ | 382/132 |
| 2010/0002676 A1 * | 1/2010 | Doi et al. | ........................ | 370/345 |
| 2010/0040303 A1 * | 2/2010 | Bosco et al. | ................... | 382/261 |

OTHER PUBLICATIONS

Lowe, David, "Distinctive Image Features from Scale-Invariant Keypoints", International Journal of Computer Vision, 60(2), pp. 91-110, 2004.*

(Continued)

*Primary Examiner* — Vu Le
*Assistant Examiner* — Xuemei Chen
(74) *Attorney, Agent, or Firm* — Oliff & Berridge, PLC (57) ABSTRACT

The present invention relates to color correction of video signals from a plurality of cameras. The apparatus has a correction order that defines a plurality of camera pairs and an order of the camera pairs, where each camera pair specifies a reference camera and a target camera. In the correction order, each camera is treated as a target camera at least one time, and the reference camera is treated as the target camera in a previous camera pair except for the first camera pair. The apparatus corrects a value of each pixel in a target image captured by the target camera based on a reference image captured by the reference camera, and replaces the target image by the corrected target image, for each camera pair in accordance with the order of the camera pairs.

17 Claims, 9 Drawing Sheets

OTHER PUBLICATIONS

Joshi et al., "Automatic Color Calibration for Large Camera Arrays," UCSD CSE Technical Report, CS2005-0821, 2005.

Sohn et al., "H.264/AVC-compatible Multi-view Video Coding," International Organisation for Standardisation—ISO/IEC JTC1/SC29/WG11-M12874, Bangkok, Thailand, Jan. 2006.

Chen et al., "Ni Luminance and Chrominance Correction for Multi-View Video Using Simplified Color Error Model," PCS2006, 2006.

Yamamoto et al., "Colour Correction for Multiple-camera System by using Correspondences," *The Journal of the Institute of Image Information and Television Engineers*, vol. 61, No. 2, pp. 1-10, 2007.

* cited by examiner

|  | CAMERA #1 | CAMERA #2 | CAMERA #3 | ... | CAMERA #n |
|---|---|---|---|---|---|
| FRAME #1 | 1,1 | 2,1 | 3,1 | ... | n,1 |
| FRAME #2 | 1,2 | 2,2 | 3,2 | ... | n,2 |
| FRAME #3 | 1,3 | 2,3 | 3,3 | ... | n,3 |
| ... | ... | ... | ... | ... | ... |
| FRAME #m | 1,m | 2,m | 3,m | ... | n,m |

| ORDER | 1 | 2 | ... | n−1 | n |
|---|---|---|---|---|---|
| TARGET | #2 | #3 | ... | #n | #1 |
| REFERENCE | #1 | #2 | ... | #n−1 | #n |

Fig. 11B

| ORDER | 1 | 2 | ... | n−1 | n | ... | 2n−2 |
|---|---|---|---|---|---|---|---|
| TARGET | #2 | #3 | ... | #n | #n | ... | #1 |
| REFERENCE | #1 | #2 | ... | #n−1 | #n | ... | #2 |

Fig. 12A

TARGET IMAGE          REFERENCE IMAGE

COLOR CORRECTION APPARATUS, METHOD AND COMPUTER PROGRAM

PRIORITY CLAIM

This application claims priority from Japanese patent application No. 2007-214702 filed on Aug. 21, 2007, which is incorporated herein by reference.

BACKGROUND OF THE INVENTION

1. Field of the Invention

The present invention relates to color correction of motion pictures captured by a plurality of cameras.

2. Description of the Related Art

In a multi-view camera system, a plurality of cameras, which are located at different positions, respectively take moving pictures, each of which has a plurality of frames or images for the same objects. Normally, the color of images taken by a camera is different from one taken by other cameras due to several factors, for example, direction of light source or characteristic variation of cameras. Therefore color correction is required, and various methods have been proposed.

For example, following three documents respectively disclose color correction methods using color pattern board, and histogram matching for some application, e.g. multi-view coding.

(1) N. Joshi, et al., "Automatic Color Calibration for Large Camera Arrays", UCSD CSE Technical Report, CS2005-0821
(2) K. Sohn, et al., "H.264/AVC-compatible Multi-view Video Coding", ISO/IEC JTC1/SC29/WG11 M12874
(3) Y. Chen, et al., "Ni Luminance and Chrominance Correction for Multi-View Video Using Simplified Color Error Model", PCS2006

In document (1), color pattern boards are used to obtain the corresponding intensities between a captured image by a camera and actual color intensities. The document (1) introduces a method to generate a linear transformation equation based on linear least square matching in the format of a 3×3 matrix or a general polynomial transformation equation. The color of each pixel in the captured image by a camera is corrected by the equation.

In document (2), color and luminance are compensated using an average and a variance in a block. This method cannot be directly used for general purpose color correction.

In document (3), the linear transformation is generated for YUV channels, the coefficients of which were searched by iterative linear transformation.

Correction using color pattern board is not suitable for outdoor and wide space coverage of multicamera systems, since providing a color pattern board is not easy. In addition, all intensities, e.g. reflection of light from a window on the board or dark areas, are blindly detected. Therefore it is impossible for some cases to capture whole intensities using the color pattern board. Furthermore, these approaches do not consider the geometrical characteristic of multicamera systems.

Further, the histogram based correction method cannot handle occlusion areas, so that the quality of correction depends on these areas.

On the other hand, another method is proposed in a following document.

(4) K. Yamamoto, et al., "Colour Correction for Multiple-camera System by using Correspondences", The Journal of The Institute of Image Information and Television Engineers, Vol. 61, No. 2, pp. 1 to 9, 2007

In the method, one camera takes reference image, and other cameras take target images. Then corresponding pixel pairs between the reference image and the target image are searched, and then each pixel in the target image is corrected by the corresponding pixel in the reference image. Thus, the problem of the color pattern board method can be avoided.

However, the quality of color correction becomes worse with increasing a distance between the camera for reference images and the camera for target images. Moreover, if there is an occlusion in a reference image, color correction of target image pixels, which are not shown in the reference image, is not possible.

SUMMARY OF THE INVENTION

The invention proposes remedies for above mentioned drawbacks.

According to the present invention, a color correction apparatus for images captured by a plurality of cameras has a first unit and a second unit. The first unit stores a correction order, which defines a plurality of camera pairs and an order of the camera pairs, where each camera pair defines a reference camera and a target camera. The second unit corrects a value of each pixel in a target image captured by the target camera based on a reference image captured by the reference camera, and replaces the target image by a corrected target image, for each camera pair in accordance with the order of the camera pairs. In the correction order, each camera is treated as a target camera at least one time, and the reference camera in a certain camera pair is treated as the target camera in the previous camera pair except for the first camera pair.

Preferably, the color correction apparatus further has a third unit, which determines a repeat of the process in the second unit based on a correction amount for each camera pair, where the correction amount for a camera pair is based on a change value of each pixel in the target image of the camera pair.

Advantageously, the target camera in a certain camera pair is treated as the reference camera in the next camera pair except for the last camera pair of the correction order, and two cameras in the camera pair are adjacently located.

Preferably, the second unit has a correspondence output unit and a color correction unit. The correspondence output unit determines pixel pairs having a pixel in the target image and a corresponding pixel in the reference image. The color correction unit generates a lookup table indicating pixel values before-and-after color correction based on the pixel pairs, and corrects pixels in the target image based on the lookup table.

Advantageously, the correspondence output unit determines the pixel pairs from the target image and reference image captured at almost the same time. Preferably, the determined pixel pairs are from a plurality of target images and reference images captured at difference time instances.

Advantageously, the color correction unit has a 2-dimensional Gaussian distribution generating unit, a total distribution generating unit and a lookup table generating unit. The 2-dimensional Gaussian distribution generating unit generates a 2-dimensional Gaussian distribution for each pixel pair. The 2-dimensional Gaussian distribution for a pixel pair has an average equal to pixel values of the pixel pair and a predetermined variance. The total distribution generating unit generates a total distribution by accumulating the 2-dimensional Gaussian distribution. Alternately, the total distribution can be generated by calculating a product of the 2-dimensional Gaussian distribution and a weight for each pixel pair, and accumulating products over all pixel pairs. In this case, the weight has a value, which becomes smaller when the difference of pixel values of the pixel pair is increased. The lookup table generating units generates the lookup table by setting a distribution value for each coordinate on a x-y plane based on the total distribution, and selects one coordinate for each x value. An x value of the selected coordinate indicates a pixel value before correction, and a y value of the selected coordinate indicates a pixel value after correction.

Preferably, the lookup table generating unit selects coordinates such that a total of a first value and a second value makes minimum. Here, the first value is a sum of the distribution values which become smaller as the distribution amount become larger, and the second value is a sum of adjustment factors. The adjustment factor is defined for each adjacent coordinate pair, and become smaller as a slope of the line through the adjacent coordinate pair approximating to 1.

Preferably, the lookup table generating unit selects a coordinate having the maximum distribution amount of the total distribution among coordinates having the same x value, for each x value.

According to a color correction method of the invention, the method corrects images captured by a plurality of cameras using a correction order, where the correction order defines a plurality of camera pairs and an order of the camera pairs, and each camera pair defines a reference camera and a target camera. In the method, following steps are performed for each camera pair in accordance with the order of the camera pairs. In the first step, a pixel value of a target image captured by the target camera is corrected based on a reference image captured by the reference camera. In the second step, the target image is replaced by the corrected target image. In the correction order, each camera is treated as a target camera at least one time, and the reference camera in a certain camera pair is treated as the target camera in the previous camera pair except for the first camera pair of the correction order.

Further, a computer program, which makes a computer as the color correction apparatus, is provided. The computer program is stored in the computer readable medium.

Further objects and advantages of the present invention will be apparent from the following description of the preferred embodiments of the invention as illustrated in the accompanying drawings.

DETAILED DESCRIPTION OF THE INVENTION

Figure 8:
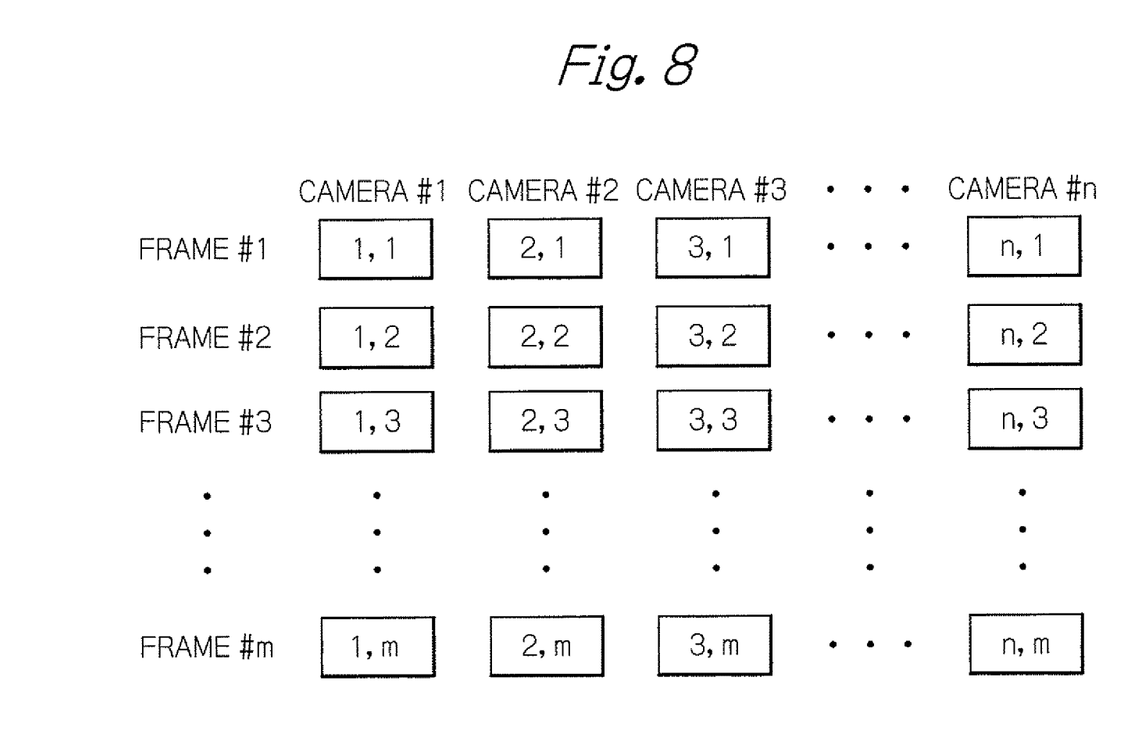
FIG. 8 shows frames taken by a plurality of cameras.

FIG. 8 shows motion pictures captured by cameras #1-#n simultaneously. Each motion picture includes m images or frames numbered as #1-#m, and frames having the same number are captured about the same time. According to the invention, the relation of a reference image to a target image is relative, and not fixed. More specifically, for example, with regard to a image captured by the camera #1 and a image captured by the camera #2, the image captured by the camera #1 is treated as reference, and the image captured by the camera #2 is treated as target, while the image captured by the camera #2 is treated as reference with regard to a image captured by the camera #3. In this case, the image captured by the camera #2 is corrected using the image captured by the camera #1, and the corrected image captured by the camera #2 is used as a reference image for correcting the image captured by the camera #3. Thus, a "correction order" is defined beforehand.

Figure 10A:
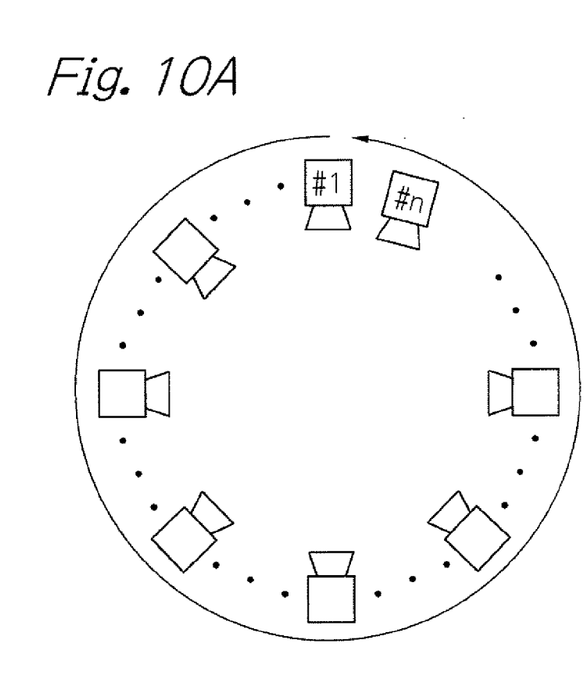
FIGS. 10A and 10B respectively show an embodiment of a camera arrangement.
Figure 10B:
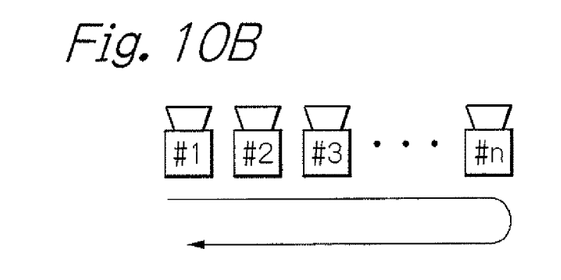
Figure 11A:
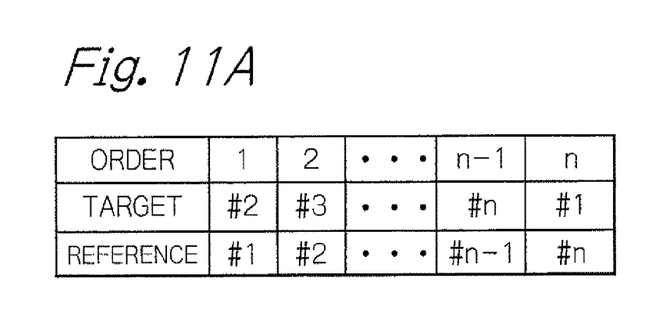
FIG. 11A shows an embodiment of a correction order for the camera arrangement shown in FIG. 10A.

The correction order specifies a plurality camera pairs and a sequence or order of the camera pairs. One camera in a camera pair is a reference camera, and another camera in the camera pair is a target camera. Each camera in the camera pair is specified by a camera number. FIG. 10A and FIG. 10B respectively show an exemplary arrangement of cameras. FIG. 11A shows an exemplary embodiment of a correction order for the arrangement shown in FIG. 10A, and FIG. 11B shows an exemplary embodiment of a correction order for the arrangement shown in FIG. 10B.

In FIG. 10A, cameras are circularly arranged with anti-clockwise numbering, and the correction order in FIG. 11A has an n camera pairs. According to the correction order in FIG. 11A, the first camera pair includes the camera #1 as reference and the camera #2 as target. The second camera pair includes the camera #2 as reference and the camera #3 as target, and the last camera pair, i.e. nth camera pair includes the camera #n as reference and the camera #1 as target. Thus the correction order in FIG. 11A chooses adjacent cameras for each camera pair. In accordance with the correction order in FIG. 11A, a frame captured by the camera #2 is corrected using a frame captured by the camera #1, and then a frame captured by the camera #3 is corrected using the corrected frame captured by the camera #2. Color correction is performed in the same way, and finally, a frame captured by the camera #1 is corrected using an already corrected frame captured by the camera #n. When the frame captured by the camera #1 is corrected, one turn of the color collection is completed.

Figure 11B:
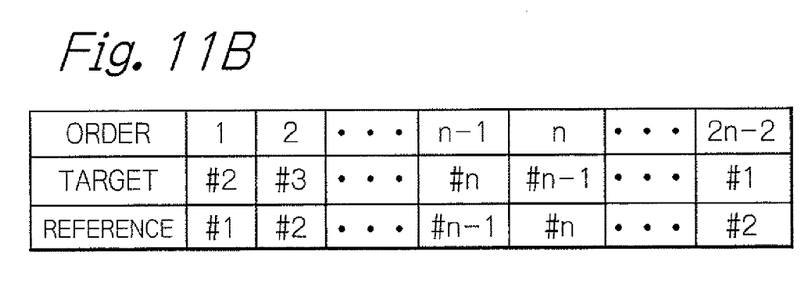
FIG. 11B shows an embodiment of a correction order for the camera arrangement shown in FIG. 10B.

In FIG. 10B, cameras are arranged in a line, and the correction order in FIG. 11B has 2n-2 camera pairs. According to the correction order in FIG. 11B, firstly, a frame captured by the camera #2 is corrected using a frame captured by the camera #1, then a frame captured by the camera #3 is corrected using the corrected frame captured by the camera #2. Color correction is performed in the same way, and a frame captured by the camera #n is corrected using an already corrected frame captured by the camera #n-1. Then, the corrected frame captured by the camera #n-1 is corrected again using the corrected frame captured by the camera #n. When a frame captured by the camera #1 is corrected using the corrected frame captured by camera #2, one correction turn of the correction order completes.

As explained above using FIGS. 10A, 10B, 11A and 11B, the correction order or sequence depends on an arrangement of cameras, and is predetermined based on following conditions. The first condition is that a reference camera is selected from cameras that have already treated as a target camera except for the first camera pair of the correction order. In other word, a target camera in a certain camera pair is treated as a reference camera in the previous camera pair except for the first camera pair. The second condition is that all cameras must be treated as a target camera at least one time. Further, a camera selected as target in a certain camera pair is preferably selected as reference in the next camera pair except for the last camera pair as shown in FIGS. 11A and 11B. Preferably, a camera pair is chosen such that a distance between a reference camera and a target camera makes shorter, and advantageously adjacent cameras are treated as a camera pair.

Figure 9:
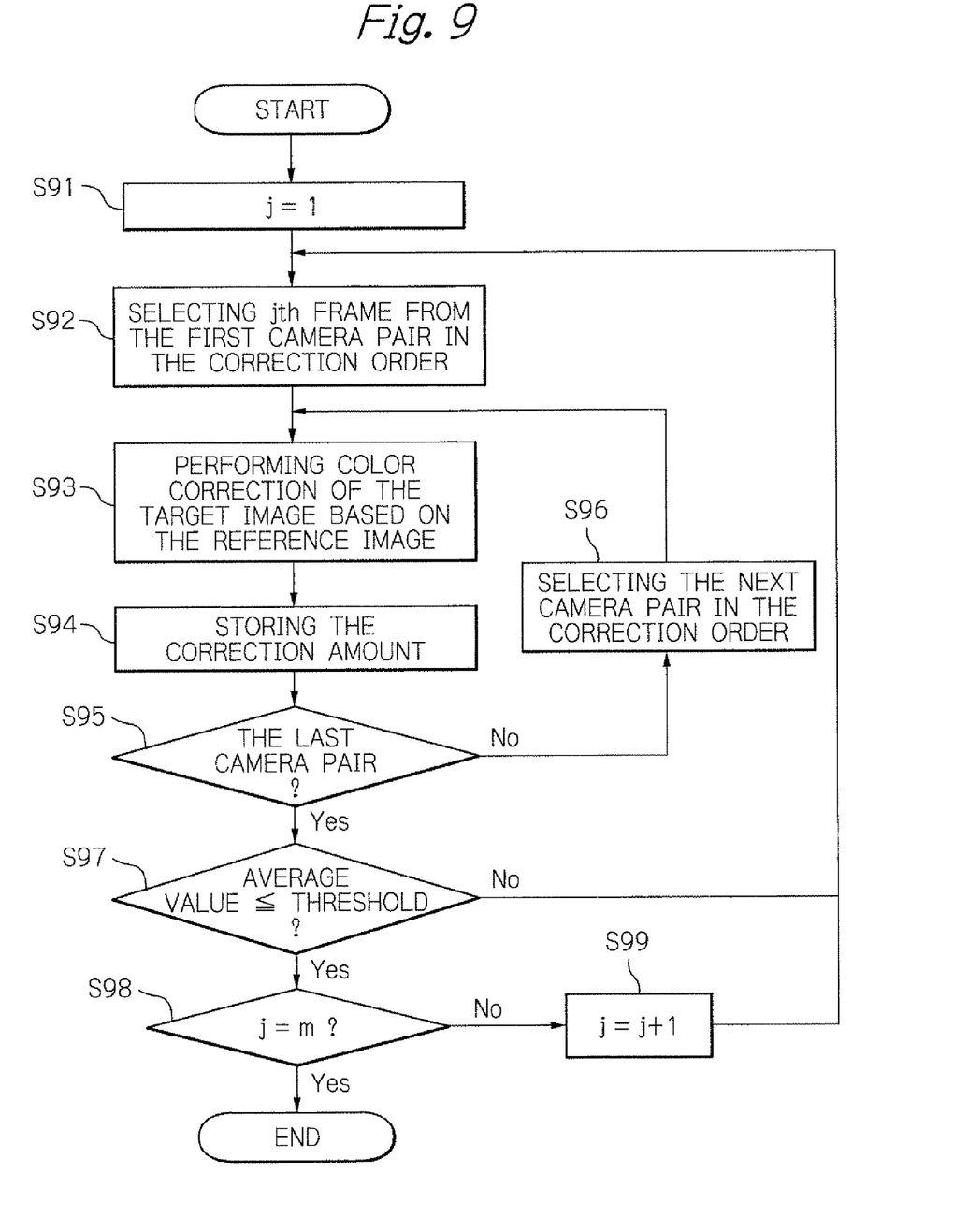
FIG. 9 shows a flow chart according to the invention.

FIG. 9 shows a flow chart of the method according to the invention. In a step 91, a variable j for frame number is set to 1. In a step 92, the jth frames captured by cameras in the first camera pair are selected. For example, in case of the correction order in FIG. 11A, the frame #1 of the camera #1 and the frame #1 of the camera #2 are selected. Then in a step 93, color of the target image is corrected using the reference image. For example, in case of the correction order in FIG. 11A, the frame #1 of the camera #2 is corrected using the frame #1 of the camera #1. In a step 94, a correction amount is calculated and recorded. The detail of color correction and calculation of the correction amount are described later.

In a step 95, it is checked whether the current processed camera pair is the last one in the correction order or not. If not, the next camera pair is selected in accordance with the correction order in a step 96, and the steps 93 to 95 are repeated until the last camera pair is processed. If the current pair is the last pair in the step 95, then an average value of correction amounts is calculated and compared with a predetermined threshold in a step 97. Here, the average value is obtained by dividing a sum of correction amounts over all camera pairs by the number of camera pairs. If the average value is greater than the threshold, steps 92 to 95 are repeated. If the average value is less than or equal to the threshold, then it is checked whether the current frame is the last or not in a step 98. If the current frame is not the last frame, the variable j is increment by 1 in a step 99, and steps 92 to 98 are repeated.

Figure 1:
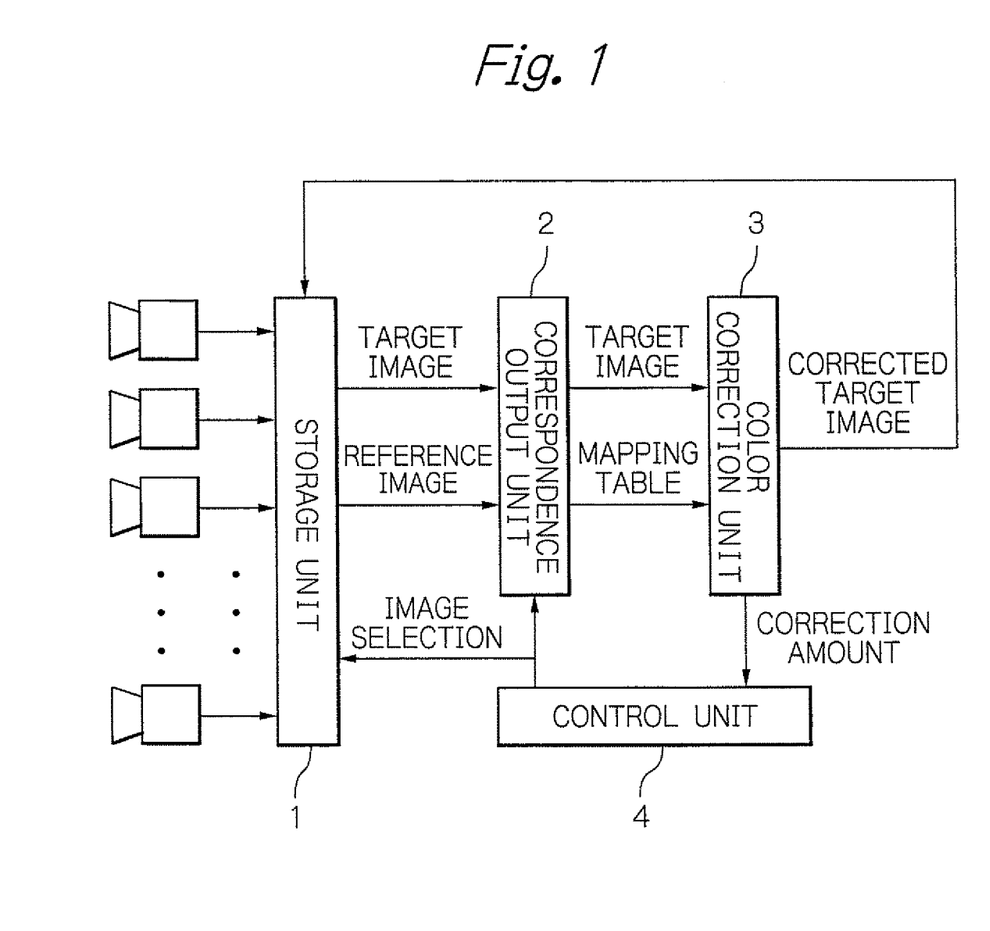
FIG. 1 shows a block diagram of an apparatus according to one embodiment of the present invention.

FIG. 1 shows a block diagram of an apparatus according to an embodiment of the present invention. As shown in FIG. 1, the apparatus has a storage unit 1, a correspondence output unit 2, a color correction unit 3 and a control unit 4. The storage unit 1 stores video signals, each of which includes m frames or images, captured by a plurality of cameras. The control unit 4 stores a correction order, manages a current processed camera pair in the correction order as well as the current processed frame number, and control the storage unit 1 to output a reference image and a target image to the correspondence output unit 2. Here, the reference image is a one having current processed number and captured by the reference camera in the current camera pair, and the target image is a one having current processed number and captured by the target camera in the current camera pair.

Based on the reference image and the target image, the correspondence output unit 2 generates a mapping table, and outputs the mapping table and the target image to the color correction unit 3. The color correction unit 3 performs color correction of the target image, and it outputs a correction amount to the control unit 4 when it completes color correction of the target image. The control unit 4 stores the correction amount for each camera pair, and it calculates average value of correction amounts when all camera pairs in the correction order are processed. Then the control unit 4 compares the average value with a predetermined threshold. As described above, the control unit 4 decides whether the same frames should be processed again or moves to frames having the next number based on the comparison result.

Figure 2:
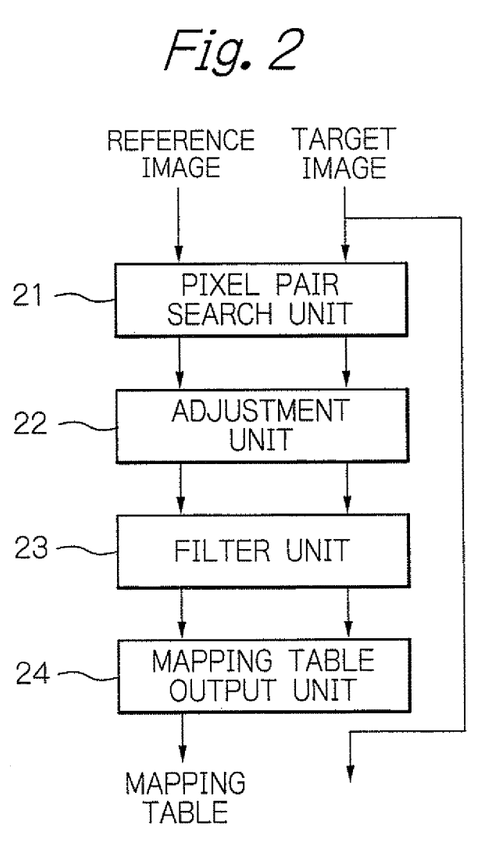
FIG. 2 shows a block diagram of a correspondence output unit according to the embodiment.

FIG. 2 shows a block diagram of the correspondence output unit 2. The correspondence output unit 2 has a pixel pair search unit 21, an adjustment unit 22, a filter unit 23 and a mapping table output unit 24.

The pixel pair search unit 21 searches pairs of corresponding pixels from each images. That is, the pixel pair search unit 21 finds a pixel corresponding to one in the reference image from the target image and vice versa. To find pixel pairs, it is possible to use, for example, a SIFT (Scale Invariant Feature Transform) method or other known method. Then the pixel pair search unit 21 outputs searched pixel pairs to the adjustment unit 22.

The adjustment unit 22 eliminates some pixel pairs, which can be determined as incorrect obviously due to camera parameters. For example, if the pixel pair search unit 21 outputs a pixel in right upper corner of the reference image and a pixel in left lower corner of the target image as a pixel pair, while the difference of pixels in a pixel pair are at most several tens pixels between the reference image and the target image based on an angle, direction and location of both cameras, it can be decided as a wrong pixel pair. In this case, the adjustment unit 22 eliminates the wrong pair.

Figure 12A:
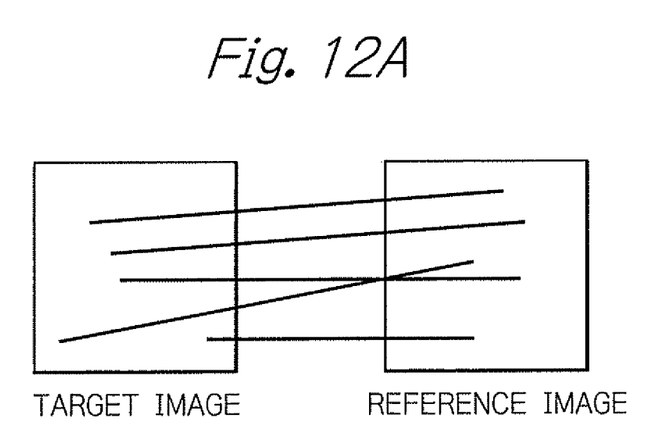
FIGS. 12A and 12B show another embodiment of eliminating wrong pixel pairs.
Figure 12B:
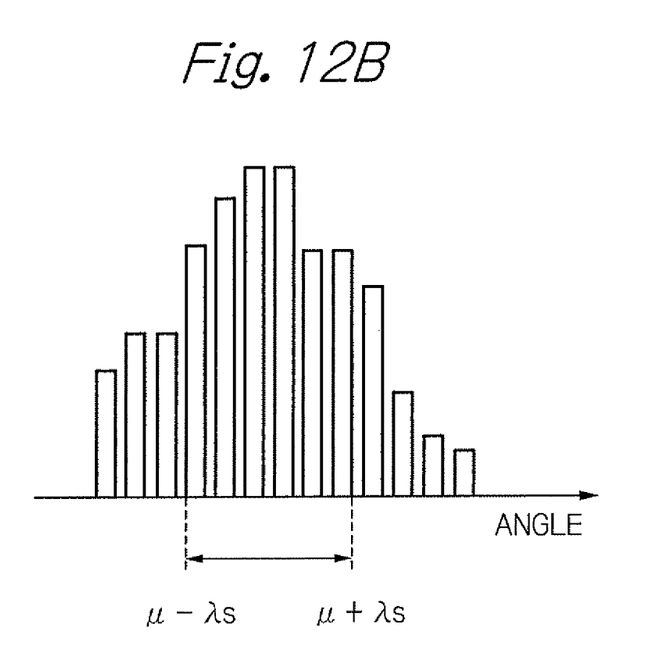

In another embodiment, the adjustment unit 22 can find wrong pixel pairs using the histogram of angles of lines, which connects corresponding pixel pairs as shown in FIGS. 12A and 12B. As shown in FIG. 12A, the reference image and the target image are put next to each other, and angles can be calculated based on an arbitrary reference. Assuming that the corresponding angles are normally distributed, then mean "$\mu$" and standard deviation "s" of the histogram are calculated. As shown in FIG. 12B, the adjustment unit 22 keeps corresponding pixel pairs in the range of $\mu \pm \lambda s$, and suppresses corresponding pixel pair, which angle is greater than $\mu + \lambda s$ and smaller than $\mu - \lambda s$. Where a coefficient "$\lambda$" adjusts the range of suppression, so that suppression is not restricted to only multi-view images with parallel epipole. In other word, color correction of random multicamera arrangement, such as general camera sensor network is possible using the invention. "$\lambda$" is set as a parameter.

The filter unit 23 performs Gaussian filtering for both the reference image and the target image several times. With this filtering, color intensities are smoothed. Then smoothed color intensities from the same location obtained by the adjustment unit 22, i.e. location of pixel pairs after eliminating wrong pixel pairs, are collected. The filter unit 23 outputs the filtered pixel pairs to the mapping table unit 24. The filter unit 23 improves the accuracy of color correction due to following reasons. Captured images basically contain high spatial resolution and noises, whereas Gaussian filtered images do not. In order to sample corresponding points without high spatial resolution and noises, several orders of Gaussian filtered images of the pair are generated. Furthermore, Gaussian filtering increases the total number corresponding intensities and allows to pick better corresponding points in edge area. In case the filter unit 23 is not provided, the adjustment unit 22 directly outputs to the mapping table unit 24.

Figure 4:
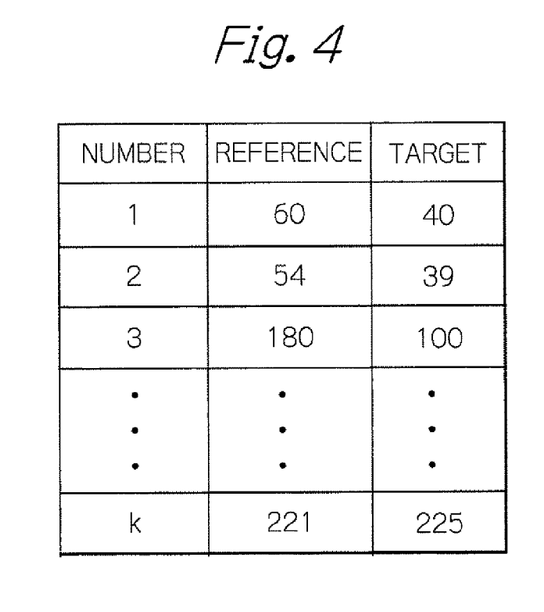
FIG. 4 shows an embodiment of a mapping table.

The mapping table output unit 24 outputs a mapping table for each color, i.e. blue, red and green, based on outputs from the filter unit 23 or the adjustment unit 22. The mapping table shows pixel values of each pixel pair. FIG. 4 shows an exemplary embodiment of the mapping table, which has k pixel pairs, for one color. For example, the mapping table shows the reference image pixel, which value equal to 60, corresponds to the target image pixel, which value equal to 40.

Figure 3:
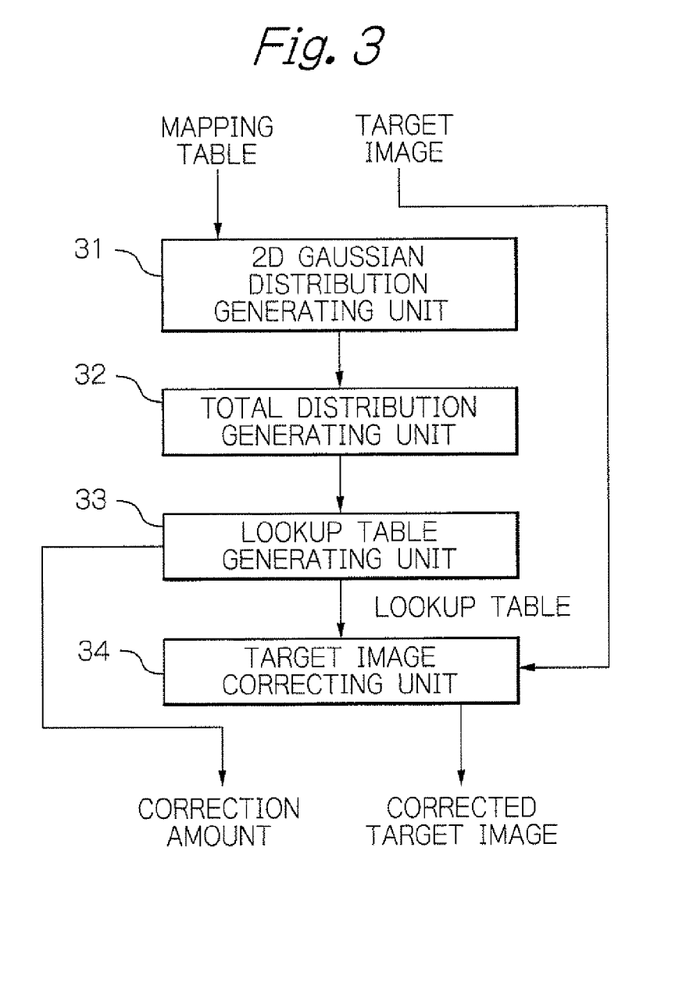
FIG. 3 shows a block diagram of a color correction unit according to the embodiment.

FIG. 3 shows a block diagram of the color correction unit 3. As shown in FIG. 3, the color correction unit 3 includes a 2D (2-Dimensional) Gaussian distribution generating unit 31, a total distribution generating unit 32, a lookup table generating unit 33 and a target image correcting unit 34.

Figure 5:
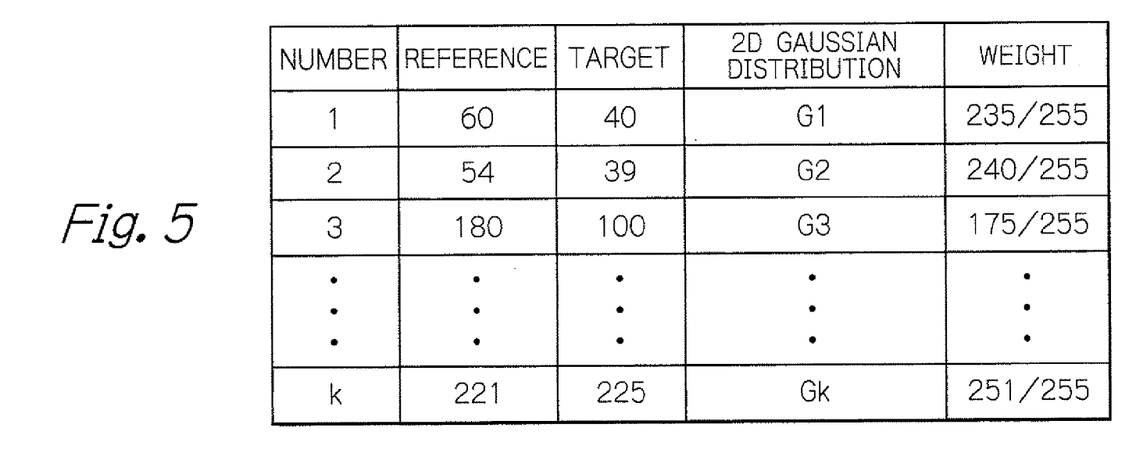
FIG. 5 is an explanation drawing of processes performed in a 2D Gaussian distribution generating unit and a total distribution generating unit.

The 2D Gaussian distribution generating unit 31 generates a 2D Gaussian distribution for each pixel pair in the mapping table. The 2D Gaussian distribution for the pixel pair has a mean value, which equal to pixel values of the pair, and has a predetermined variance value. In the following explanation, the target image is assigned to x-coordinate, and the reference image is assigned to y-coordinate, however, it is possible to alternate x-coordinate and y-coordinate. For example, the 2D Gaussian distribution generating unit 31 generates k 2D Gaussian distributions G1 to Gk as shown in FIG. 5, when the mapping table as shown in FIG. 4 is input to it. The average of G1 is as follows.

$$(x,y)=(40,60)$$

The variance is experimentally decided by applying the color correction method according to the invention to several video signals.

The total distribution generating unit 32 generates a total distribution by accumulating a product of the 2D Gaussian distribution and its weight. For example, if each weight is set as shown in FIG. 5, the total distribution is calculated as follows.

$$(235*G1+240*G2+175*G3+\ldots+251*Gk)/255$$

The use of weight is not mandatory. However, in case of using the weight, it is preferable to use a value, which become smaller with increasing the difference between pixel values of the pair. In FIG. 5, the weight is calculated using a following equation.

$$\text{Weight}=(255-|P_{reference}-P_{target}|)/255$$

Where, $P_{reference}$ is a pixel value of the reference image pixel in the pair, and $P_{target}$ is a pixel value of the target image pixel in the pair.

Figure 13:
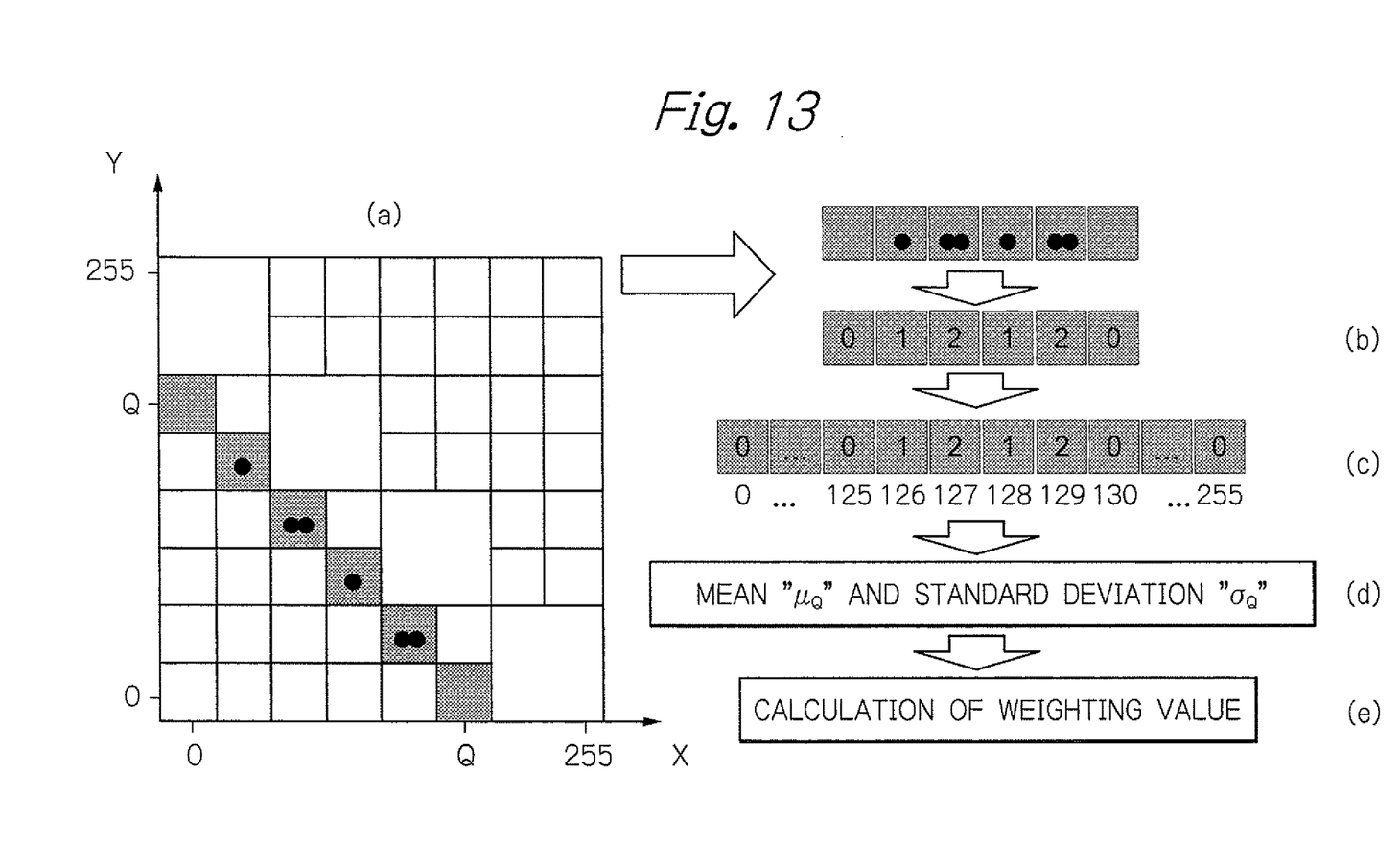
FIG. 13 shows another embodiment of calculating weights.

In another embodiment, the weight can be generated non-linearly as shown in FIG. 13. Given a color channel, at first a histogram of corresponding intensities in x-y plane is calculated. Then, the histogram is cut locally along lines normal to line "x=y" (i.e. x+y=Q Q={0,1,…,$Q_i$,…,2×255}). In order to generate weights that give the highest value to the most emphasized corresponding intensities, while reducing the effect of those with large difference, a distributions along lines (x+y=Q) is simply considered. The normalized probabilities are weighting values as shown in following equation, e.g. for Gaussian based weighting of a pair $(x_i,y_j)$ with "$\mu_Q$" and "$s_Q$".

$$\alpha(x_i, y_i) = \exp\left(-\frac{(h_i - \mu_{Q_i})^2}{2\sigma_{Q_i}^2}\right)$$

where "$h_i$" is the number of $(x_i,y_j)$ corresponding intensities in the histogram that are parallel to x+y=$Q_i$. To treat all distributions along all x+y=$Q_i$ lines equally, the length of histograms are expanded to 256 members. The histogram value will be zero if the length of x+y=$Q_i$ is less than 256 as shown in FIG. 13. It is noted that other distribution can be used to compute the weighting coefficient, e.g. Laplace, Triangular, polynomial distributions but not limited to, by calculating the statistical measures of the designated distribution of the histogram in FIG. 13.

By using the weight above, it is possible to reduce the effect caused by the pair, which pixel values are too much different, and give the highest importance to pixel values which are repeated the most, for color correction. That is, it is possible to control the effect caused by the pair having large difference value. In case the weight is not used, the total distribution is calculated by summing all 2D Gaussian distributions.

The lookup table generating unit 33 generates a lookup table, which indicates a new pixel value for a current pixel value. That is, it shows the relation of pixel values before-and-after color correction. The detail of the generation is explained below.

Firstly, the lookup table generating unit 33 calculates a distribution amount for each coordinate on an x-y plane using the total distribution which is a function of x and y. That is, if the total distribution is Total(x, y), then the distribution amount for the coordinate (xk, yk) is Total(xk, yk). Then, it converts the distribution amount for each coordinate to a distribution value for each coordinate using a predetermined scale.

Figure 6:
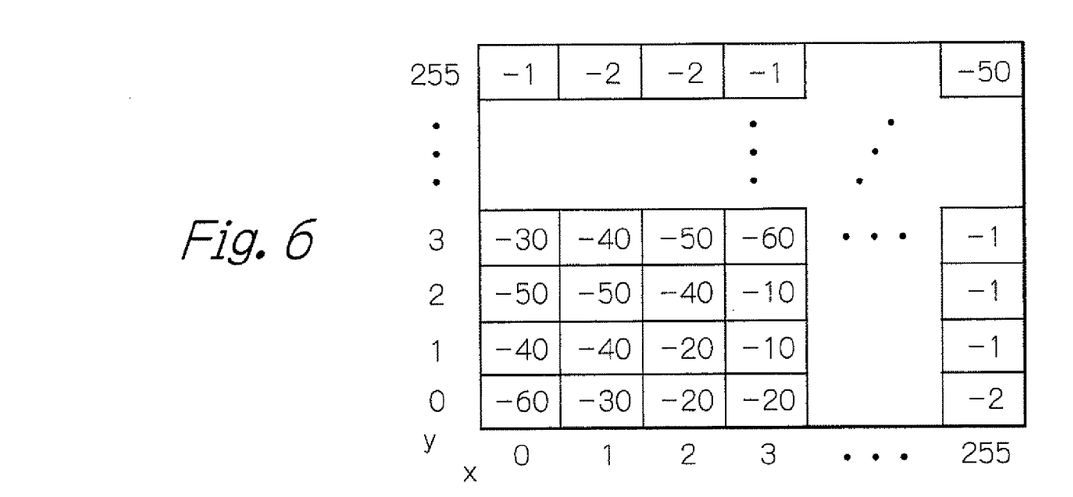
FIG. 6 shows an embodiment of values on an x-y plane based on a total distribution.

FIG. 6 shows an exemplary embodiment of distribution values on the x-y plane, where range of pixel value is 0-255, and therefore the x-y plane has 256*256 coordinates. In FIG. 6, the distribution value for the coordinate (1, 0) is −30, and the distribution value for the coordinate (255, 0) is −2. In FIG. 6, the distribution value is scaled such that it has a negative value, and become smaller as the distribution amount increases. Normally, a coordinate, which has a similar x value and y value, has a high probability, i.e. a large distribution amount. Thus, the distribution value is set to become smaller for the coordinates of high probability, because, as describing the detail later, a lookup table is generated using a dynamic programming (DP) method to minimize an energy value based on the distribution value. However, it is appreciated that the person in the art can easily modify the invention to use a positive distribution values, and also to use a distribution value, which become larger as the distribution amount increases.

Then, the lookup table generating unit 33 selects one coordinate from each x value. In case of FIG. 6, it selects total 256 coordinates, one coordinate for each x, i.e. 0-255. Here, x value of the selected coordinate indicate a pixel value before color correction, and y value of the selected coordinate indicate a pixel value after color correction.

Figure 7:
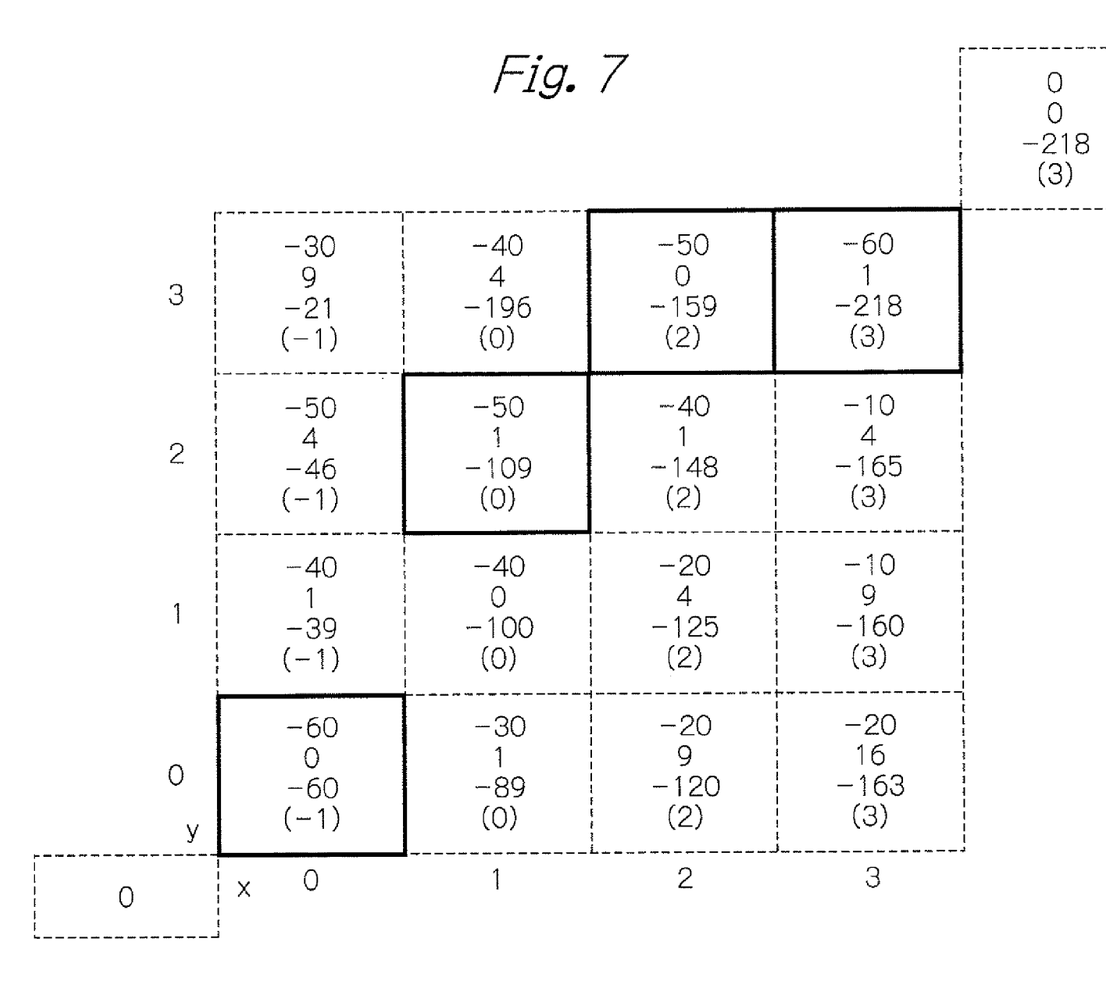
FIG. 7 is an explanation drawing of generation of a lookup table.

For sake of simplicity, an x-y plane in FIG. 7 is used to explain the generation of the lookup table, where the range of pixel value is 0-3. To generate a lookup table, an adjustment factor and an energy value are defined. The adjustment factor is defined for each 2 coordinates, which x values differ by one. The adjustment factor becomes smaller, as the slope of the line through 2 coordinates close to 1. In the embodiment, the adjustment factor $Aj_{\alpha,\beta}$ for coordinate pair (x, α) and (x+1, β) is defined as followings.

$$Aj_{\alpha,\beta}=(\beta-\alpha-1)^2$$

Further it is possible to multiply above equation by predetermined integer.

The energy value is defined for each coordinate, and the energy value $E_{x0,y0}$ for a coordinate (x0, y0) is calculated as follows.

$$E_{x0,y0}=\text{Min}(E_{x0-1,p}+D_{x0,y0}+Aj_{p,y0}) \text{ for } 0<=p<=3 \quad (1)$$

Where $D_{x0,y0}$ is a distribution value of the coordinate (x0, y0), and Min( ) is a function to select the minimum value among each p.

The lookup table generating unit 33 firstly calculates energy values for coordinates (0, 0), (0, 1), (0, 2) and (0, 3). For this reason, it assumes a coordinate (−1, −1) as a start point, here the distribution value of the coordinate (−1, −1) is 0. Because only one coordinate is present in x=−1, energy value of each coordinate in x=0 is calculated by summing the distribution value of the coordinate and the adjustment factor between the coordinate and (−1, −1). In FIG. 7, numbers in each coordinate show the distribution value, the adjustment factor for a path, the energy value and the path from top to bottom. Here, the path means value of p, which makes the equation (1) minimum.

For example, to calculate the energy for the coordinate (a, b), following four values need to be calculated.

$$E_{a-1,0}+D_{a,b}+Aj_{0,b}$$

$$E_{a-1,1}+D_{a,b}+Aj_{1,b}$$

$$E_{a-1,2}+D_{a,b}+Aj_{2,b}$$

$$E_{a-1,3}+D_{a,b}+Aj_{3,b}$$

If $E_{a-1,3}+D_{a,b}+Aj_{3,b}$ is minimum among 4 values, then 3 is the path for the coordinate (a, b).

Then, the lookup table generating unit 33 calculates energy values for coordinates (1, 0), (1, 1), (1, 2) and (1, 3) based on the equation (1). For example, for the coordinate (1, 0), the value in parenthesis of equation (1) is as follows.

$$-60+1-30=-89 \text{ for } p=0$$

$$-39+4-30=-65 \text{ for } p=1$$

$$-46+9-30=-67 \text{ for } p=2$$

$$-21+16-30=-35 \text{ for } p=3$$

Therefore, for the coordinate (1, 0), the energy value is −89, the adjustment factor is 1, and the path is 0.

Similarly, the lookup table generating unit 33 calculates energy value for x=2 and x=3. Finally, to terminate the path, it assumes a coordinate (4, 4) with the distribution value 0, and calculates the energy value and the path for the coordinate (4, 4). Then, the lookup table generating unit 33 selects one coordinate for each x value by following the path in descending order of x from the coordinate (4, 4). In FIG. 7, since the path of the coordinate (4, 4) is 3, the lookup table generating unit 33 selects the coordinate (3, 3) for x=3. Then the lookup table generating unit 33 selects the coordinate (2, 3) for x=2, because the path of the selected coordinate (3, 3) is 3. Further, it selects the coordinate (1, 2) for x=2, because the path of the selected coordinate (2, 3) is 2. Finally, it selects the coordinate (0, 0) for x=0, because the path of the selected coordinate (1, 2) is 0. Then the lookup table generating unit 33 generates a lookup table, which has selected coordinates. In case of FIG. 7, coordinates (0, 0), (1, 2), (2, 3) and (3, 3) are recorded in the lookup table. Thus, the optimal path is selected using the DP method.

In case pixel values of the target image are just shifted relative to ones of the reference image, in other words, only intensities are different, the slope of the line through coordinates in the lookup table is 1. Normally, difference of color between cameras is mainly the simple shift of the brightness, and in this case, the slope of the line through coordinates in the lookup table is about 1. The larger adjustment factor makes the slope of the line through coordinates closer to 1. It is appreciated the use of the adjustment factor is not mandatory, and if it is not used, the coordinate, which has the maximum distribution amount for each x value, is selected for the lookup table.

The lookup table generating unit 33 also generates the correction amount based on the lookup table. The correction amount has a value, which becomes larger with difference of x value and y value of each coordinate included in the lookup table increasing. For example, it is calculated as follows for the lookup table having coordinates (xi, yi).

$$\text{The correction amount}=\Sigma ABS(yi-xi)$$

Where, ABS is a function to calculate an absolute value. In case of the lookup table in FIG. 7, the difference of x-value and y-value of coordinates are 0, 1, 1 and 0 for x=0, 1, 2 and 3. Thus the correction amount is 2. Further it can be accumulated value of the adjustment factor of each coordinate included in the lookup table. That is, it can be calculated as follows.

$$\text{The correction amount}=\Sigma(yi-xi)^2$$

The target image correcting unit 34 corrects a pixel value in the target image in accordance with the lookup table, and stores the corrected target image in storage unit 1. Only corrected target image is required in later processes, and the original target image is no more used. Therefore, it is preferable to delete the original target image, or replace the original target image by the corrected target image. The color correction is performed by replacing a pixel value using coordinates included in the lookup table. For example, in case of the lookup table in FIG. 7, pixel values 0, 1, 2 and 3 are respectively changed to 0, 2, 3 and 3.

In the embodiment described above, all coordinates in a certain x value are considered to calculate the energy value of coordinates having next x value in accordance with the equation (1). In this case, the line through coordinates in the lookup table in ascending order of x may zigzags up and down, and may affect color correction quality. To avoid the zigzag line, the following equation can be used to calculate the energy value for the coordinate (x0, y0) instead of the equation (1).

$$E_{x0,y0}=\text{Min}(E_{x0-1,p}+D_{x0,y0}+Aj_{p,y0}) \text{ for } 0<=p<=y0 \quad (2)$$

According to the equation (2), coordinates, which make the slope negative, are unconsidered, and may improve the color correction quality.

The invention does not use the color pattern board, and is suitable for both indoor and outdoor environments. Further, video signal for reference images is not taken by only one camera, rather images taken by one camera is treated as reference or target depends on the relation to other cameras. Therefore, the invention can effectively improve the color correction quality and reduce color variation among cameras, because it can avoid degradation of color correction caused by the distance between cameras for reference images and the target images.

Moreover, since color correction is performed using Gaussian distributions, i.e. not only by a corresponding pixel in the reference image, it is possible to correct the target image, even though there are occlusions in the reference image.

Further, by using weights for generating the total distribution, it is possible to control the effect caused by corresponding pixel pairs having a large pixel value difference easily. This is an advantage for stable color correction in various environments.

In the embodiment described above, the mapping table is generated from the target image and the reference image having the same frame number. However, it is possible to use other frames. For example, for correcting the frame #1 captured by the target camera #2 using the reference camera #1, it is possible to use following frame pairs to generate the mapping table.

(A) frame #1/camera #1 and frame #1/camera #2
(B) frame #2/camera #1 and frame #2/camera #2
(C) frame #3/camera #1 and frame #3/camera #2

Thus, by using other numbered frame pairs for generating the mapping table, corresponding pixel pairs at other time instance are also used to generate the lookup table, and it is possible to achieve the stable color correction with time by increasing the number of corresponding points for the given pair of target image and reference image. In addition it is possible to obtain corresponding pixel pairs in occluded area that was not covered in the first frame of the pair, assuming that the occluded parts can be appeared in both target and reference camera in following frames.

In the embodiment described above, the mapping table is generated from the target image and the reference image, for R, G and B color channels independently. However, it is possible to use other color channel to generate the mapping table, such as YUV, HSV etc.

Many modifications and variations will be apparent those of ordinary skilled in the art. The embodiments was chosen and described in order to best explain the principles of the invention. It should be understood that the present invention is not limited to the specific embodiments described in the specification, except as defined in the appended claims.

For example, the invention may be achieved by a program, which realizes the functions of the above embodiments, when executed in a computer. Programs defining functions on the invention can be delivered to a computer system using computer readable storage media or via network. It should be understood the invention may be implemented by software, hardware or a combination of software and hardware.

The invention claimed is:

1. A color correction apparatus for images captured by a plurality of cameras ordered 1, 2, . . . , n, comprising:
   first means for storing a correction order defining a plurality of camera pairs and an order of the camera pairs, each camera pair defining a reference camera and a target camera; and
   second means for correcting a value of each pixel in a target image captured by the target camera based on a reference image captured by the reference camera and for replacing the target image by a corrected target image, for each camera pair in accordance with the order of the camera pairs,
   wherein each camera is treated as a target camera at least one time, when camera n is corrected, the correction continues reversely, and the reference camera in each camera pair is treated as the target camera in a previous camera pair except for a first camera pair of the correction order,
   the second means comprises:
      correspondence output means for determining pixel pairs, each pixel pair having a pixel in the target image, and a pixel in the reference image corresponding to the pixel in the target image; and
      color correction means for generating a lookup table indicating pixel values before-and-after color correction based on the pixel pairs, and for correcting pixels in the target image based on the lookup table, and
      the color correction means comprises:
         2-dimensional Gaussian distribution generating means for generating a 2-dimensional Gaussian distribution for each pixel pair, the 2-dimensional Gaussian distribution having a mean equal to pixel values of the pixel pair, and a predetermined variance;
         total distribution generating means for generating a total distribution by accumulating the 2-dimensional Gaussian distribution or a product of the 2-dimensional Gaussian distribution and a weight over all pixel pairs, wherein the weight=(N−|P$_{reference}$−P$_{target}$|)/N, where P$_{reference}$ is a pixel value of the reference image pixel in the pair, P$_{target}$ is a pixel value of the target image pixel in the pair, and N is the possible maximum pixel value in an image; and
      lookup table generating means for generating the lookup table by setting a distribution value for each coordinate on an x-y plane based on the total distribution, and by selecting one coordinate for each x value,
   wherein an x value of the selected coordinate indicates a pixel value before correction, and a y value of the selected coordinate indicates a pixel value after correction.

2. The color correction apparatus according to claim 1, further comprising:
   third means for determining a repeat of the process in the second means based on a correction amount for each camera pair,
   wherein the correction amount for a camera pair is based on a change value of each pixel in the target image of the camera pair.

3. The color correction apparatus according to claim 1, wherein the target camera in each camera pair is treated as the reference camera in a next camera pair except for a last camera pair of the correction order.

4. The color correction apparatus according to claim 1, wherein the cameras in each camera pair are adjacently located.

5. The color correction apparatus according to claim 1, wherein the correspondence output means determines the pixel pairs from the target image and the reference image captured at almost a same time.

6. The color correction apparatus according to claim 1, wherein the determined pixel pairs are from a plurality of target images and reference images captured at different time instances.

7. The color correction apparatus according to claim 1, wherein the lookup table generating means selects coordinates such that a sum of a first value and a second value is a minimum, the first value is a sum of the distribution values which become smaller as the distribution amount become larger, and the second value is a sum of adjustment factors,
   wherein an adjustment factor is defined for each pair of adjacent coordinates, and becomes smaller as a slope of a line through the adjacent coordinates approaches 1.

8. The color correction apparatus according to claim 1, wherein the lookup table generating means selects a coordinate having a maximum distribution amount of the total distribution among coordinates having the same x value, for each x value.

9. The color correction apparatus according to claim 1, wherein the second means further comprises adjusting means for determining an incorrect pixel pair for using correction and eliminating the incorrect pixel pair from using the correction, and the correspondence output means determines the pixel pairs for using the correction after eliminating the incorrect pair.

10. The color correction apparatus according to claim 9, wherein the adjusting means determines the incorrect pixel pair based on an camera parameter.

11. The color correction apparatus according to claim 9, wherein the adjusting means determines the incorrect pixel pair using a histogram of angles of lines, which connects corresponding pixel pair.

12. A color correction method for images captured by a plurality of cameras ordered 1, 2, ..., n using a correction order, the correction order defining a plurality of camera pairs and an order of the camera pairs, each camera pair defining a reference camera and a target camera, comprising:

for each camera pair in accordance with the order of the camera pairs:
a first step of generating a corrected target image by correcting a pixel value of a target image captured by the target camera based on a reference image captured by the reference camera, and
a second step of replacing the target image with the corrected target image,
wherein each camera is treated as a target camera at least one time, when camera n is corrected, the correction continues reversely, and the reference camera in a certain camera pair is treated as the target camera in a previous camera pair except for a first camera pair of the correction order, and
the second step includes a correspondence output step of determining pixel pairs, each pixel pair having a pixel in the target image, and a pixel in the reference image corresponding to the pixel in the target image; and
a color correction step of generating a lookup table indicating pixel values before and after color correction based on the pixel pairs, and for correcting pixels in the target image based on the lookup table,
wherein the color correction step includes a 2-dimensional Gaussian distribution generating step of generating a 2-dimensional Gaussian distribution for each pixel pair, the 2-dimensional Gaussian distribution having a mean equal to pixel values of the pixel pair, and a predetermined variance;
a total distribution generating step of generating a total distribution by accumulating the 2-dimensional Gaussian distribution or a product of the 2-dimensional Gaussian distribution and a weight over all pixel pairs, wherein the weight=$(N-|P_{reference}-P_{target}|)/N$, where $P_{reference}$ is a pixel value of the reference image pixel in the pair, $P_{target}$ is a pixel value of the target image pixel in the pair, and N is the possible maximum pixel value in an image; and
a lookup table generating step of generating the lookup table by setting a distribution value for each coordinate on an x-y plane based on the total distribution, and by selecting one coordinate for each x value,
wherein an x value of the selected coordinate indicates a pixel value before correction, and a y value of the selected coordinate indicates a pixel value after correction.

13. The color correction method according to claim 12, further comprising a third step of determining a repeat of the first step and the second step for each camera pair in accordance with the order of the camera pairs based on a correction amount for each camera pair,
wherein the correction amount for the camera pair is based on a change value of each pixel in the target image of the camera pair.

14. The color correction method according to claim 12, wherein the second step further includes adjusting step of determining an incorrect pixel pair for using correction and eliminating the incorrect pixel pair from using the correction, and the correspondence output step determines the pixel pairs for using the correction after eliminating the incorrect pair.

15. The color correction method according to claim 14, wherein the adjusting step determines the incorrect pixel pair based on an camera parameter.

16. The color correction method according to claim 14, wherein the adjusting step determines the incorrect pixel pair using a histogram of angles of lines, which connects corresponding pixel pair.

17. A non-transitory computer readable medium having a computer program embedded thereon, the computer program, when executed by a computer, making the computer function as the color correction apparatus according to claim 1.

* * * * *